United States Patent
Maree et al.

(10) Patent No.: US 6,306,302 B1
(45) Date of Patent: Oct. 23, 2001

(54) PROCESS FOR TREATMENT OF SULPHATE-CONTAINING WATER

(75) Inventors: Johannes Philippus Maree; Andries Gerber, both of Pretoria (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 09/446,343

(22) PCT Filed: Jul. 31, 1998

(86) PCT No.: PCT/GB98/02305

§ 371 Date: Mar. 20, 2000

§ 102(e) Date: Mar. 20, 2000

(87) PCT Pub. No.: WO99/06328

PCT Pub. Date: Feb. 11, 1999

(30) Foreign Application Priority Data

Aug. 1, 1997 (ZA) .................................................... 97/6893

(51) Int. Cl.$^7$ ........................................................ C02F 3/30
(52) U.S. Cl. ........................ 210/605; 210/616; 210/617; 210/630; 210/631; 210/912
(58) Field of Search ..................... 210/612, 605, 210/615–617, 620, 621–623, 630, 631, 912; 435/262, 262.5

(56) References Cited

U.S. PATENT DOCUMENTS

| | | |
|---|---|---|
| 4,135,976 | * 1/1979 | Kitajima . |
| 4,242,448 | 12/1980 | Brown, III . |
| 4,366,059 | * 12/1982 | Witt et al. . |
| 4,940,544 | * 7/1990 | Gode et al. . |
| 5,514,278 | * 5/1996 | Khudenko . |
| 5,587,079 | * 12/1996 | Rowley et al. . |
| 5,705,072 | * 1/1998 | Haase . |
| 5,972,219 | * 10/1999 | Habets et al. . |

OTHER PUBLICATIONS

Maree et al., "Biological Sulphate Removal in an Upflow Packed Bed Reactor," *Water Res.* 19:1101–1106 (1985).

Maree et al., "Biological Sulphate Removal from Industrial Effluent in an Upflow Packed Bed Reactor," *Water Res.* 21:141–146 (1987).

* cited by examiner

Primary Examiner—David A. Simmons
Assistant Examiner—Fred Prince
(74) Attorney, Agent, or Firm—Klarquist Sparkman, LLP

(57) ABSTRACT

A process for treating water having anions comprising sulfur and oxygen dissolved therein involves subjecting the anions to an anaerobic biological reduction to sulfide anions dissolved in the water, followed by a biological oxidation of the sulfide anions to elemental sulfur suspended in the water. The sulfur is separated from the water. The reduction and oxidation are effected together in a series of common reaction stages in which there are oxidizing conditions which permit the biological oxidation without preventing the biological reduction.

10 Claims, 1 Drawing Sheet

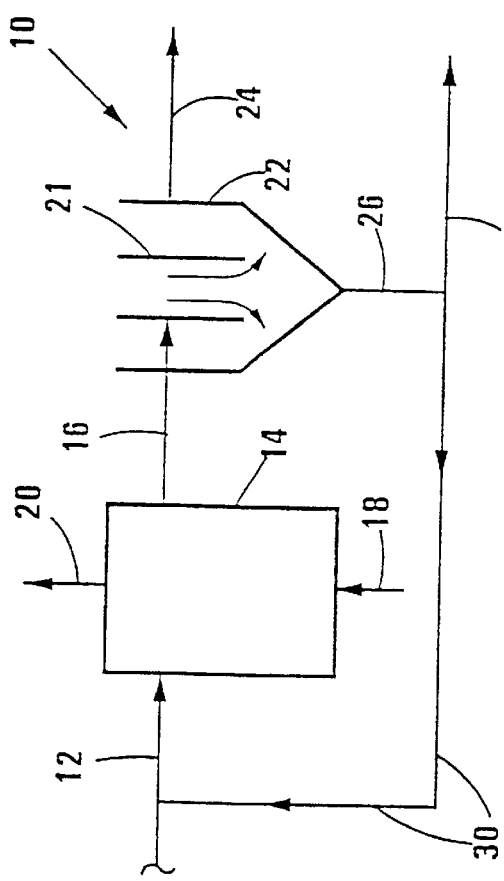
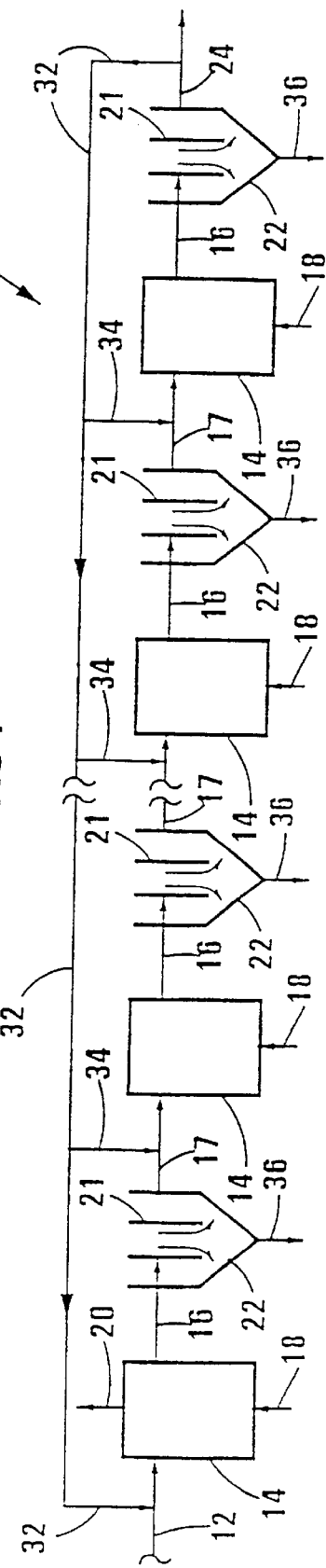
FIG 1
FIG 2

PROCESS FOR TREATMENT OF SULPHATE-CONTAINING WATER

THIS INVENTION relates to a process for treating water. More particularly, the invention relates to a process for treating raw water having anions consisting of sulphur and oxygen dissolved therein.

According to the invention there is provided a process for treating water having anions comprising sulphur and oxygen dissolved therein, the process comprising the steps of:

subjecting said anions to an anaerobic biological reduction whereby they are converted to sulphide ($S^=$) anions to produce dissolved sulphide anions in the water;

subjecting the sulphide anions, produced in the water by the anaerobic biological reduction, to a biological oxidation whereby the dissolved sulphide ions are oxidized to elemental sulphur to produce suspended elemental sulphur in the water; and separating from the water the suspended elemental sulphur produced in the water, the anaerobic biological reduction and the biological oxidation being effected simultaneously in the presence of each other in at least one common reaction stage in which there are oxidizing conditions which permit the biological oxidation to take place without preventing the anaerobic biological reduction from taking place.

Naturally separating the sulphur from the water will typically involve separating also some suspended biomass from the water.

The dissolved anions consisting of sulphur and oxygen may be selected from the group consisting of:

$SO_4^=$;
$SO_3^=$;
$S_2O_5^=$;
$S_2O_3^=$;
$S_4O_6^=$;
$S_2O_4^=$;
$S_4O_8^=$; and mixtures thereof.

The raw water may also contain dissolved $S^=$ anions.

While the oxidizing conditions may be achieved by dissolving one or more chemical oxidizing agents such as nitrate anions and/or nitrite anions or preferably oxygen, eg in the form of air, in the water, other oxidizing means can naturally be used, if convenient, such as irradiation with light to cause biological photosynthetic anaerobic oxidation. The oxidizing agent may be added to the reaction stage separately from the raw water or, particularly if it is a nitrate or nitrite, it may be present in the raw water. Sulphite anions, which can arise from acid rain, can also act, similarly to nitrate or nitrite anions, as an oxidizing agent for the biological oxidation. When the oxidation agent is air, the process may include the step of aerating the reaction stage.

In particular, the oxidation conditions in the reaction stage may be achieved by dissolving a chemical oxidizing agent in the water, the chemical oxidizing agent being selected from:

nitrate anions;
nitrite anions;
elemental oxygen; and
mixtures thereof.

Furthermore, the water in the reaction stage may be subjected to irradiation which permits photosynthetic anaerobic biological oxidation to contribute to the oxidizing conditions which permit the biological oxidation of the dissolved sulphide ions to elemental sulphur.

In a particular embodiment of the invention, expected to occur frequently in practice, the raw water, prior to the treatment thereof, may contain dissolved anions consisting of sulphur and oxygen which are selected from $SO_4^=$ (sulphate) and $SO_3^=$ (sulphite) anions, the reaction stage being subjected to irradiation and the water containing elemental oxygen as a chemical oxidizing agent dissolved therein so that both an aerobic biological oxidation of dissolved sulphide anions, and a photosynthetic anaerobic biological oxidation of dissolved sulphide anions, to form elemental sulphur in the water, take place.

For the anaerobic biological reduction may be used suitable microorganisms of the genera:

Desulfomaculum;
Desulfomonas;
Desulfobulbus;
Desulfosarcina;
Desulfobacterium;
Desulforomas;
Desulfobacter;
Desulfovibrio;
Desulfococcus; and
Desulfonema, a suitable example being *Desulfovibrio desulfuricans.*

For the biological oxidation may be used suitable microorganisms of the genera:

Thiobacillus;
Thiomicrospira;
Sulfolobus; and
Thermothrix, a suitable example being *Thiobacillus thiooxidans.*

For the biological photosynthetic anaerobic oxidation in the presence of light or irradiation a suitable microorganism is *Chlorobium limicola form a Thiosulphatophilum*, the anaerobic oxidation taking place according to the following biological reaction:

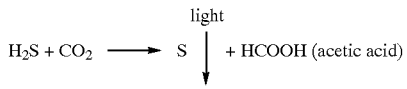

It should be noted that the biological conversion of sulphate anions to sulphide anions involves sulphite anions as intermediates, Thus, the water to be treated may often contain sulphite anions, which, as indicated above, can arise from acid rain, as well as sulphate anions, the sulphite anions also being converted to sulphide anions. Furthermore $SO_2$-rich gases emanating from power stations can be dissolved in water to form $H_2SO_3$ solutions, which can be treated.

The biological oxidation- and biological reduction reactions of the present invention will take place in the presence of a suitable metabolizable carbon source, ie an energy source, examples of which are:

sugar, as in waste sugar water;
lactate, as from lactic acid in milk products;
ethanol;
methanol;
producer gas, containing hydrogen and carbon monoxide;
methane burned in a reducing atmosphere to convert it to hydrogen and carbon monoxide; and, in general, water containing organic materials such as sewage or cheese whey.

While the process can in principle be carried out batchwise, it is conveniently continuous, water to be treated being fed continuously to the reaction stage and being continuously withdrawn therefrom, elemental sulphur and biomass being separated from the water withdrawn from the reaction stage, conveniently in a sedimentation stage as described hereunder. More particularly, the process may be carried out on a continuous basis, there being a continuous feed of raw water to the common reaction stage and the anaerobic biological reduction and the biological oxidation take place continuously in the common reaction stage, water containing elemental sulphur and biomass being continuously withdrawn from the reaction stage and continuously fed to a sludge separation stage, separate from the reaction stage, where the continuous separation of the elemental sulphur, together with biomass, from the watertakes place, the method including continuous recirculation of part of the separated sulphur and biomass, sufficient to maintain a suspended solids content in the reaction stage of 2–50 g/l.

The reaction stage may be provided in a packed-bed reactor or fixed-bed reactor, packed with a solid medium which can act as a support for the growth thereon of microorganisms, or it can be a suspended growth reactor containing suspended solids forming a microorganism support for the growth of microorganisms thereon, or it can be in the form of a fluidized bed having fluidized particles which are granules of biomass, or fluidized particles which act as a microorganism support for supporting growing microorganisms, the water being treated in each case by being passed through the bed, in the latermost case upwardly and acting to fluidize the bed. Instead the reaction stage may be provided by a completely mixed reactor, or by a plug-flow- or a slug-flow reactor, or a baffled-flow reactor or a gas-lift reactor. Conveniently, however, the process may, as indicated above, include a separation stage such as a sedimentation stage, downstream of the reaction stage in the direction of flow of water being treated, elemental sulphur and optionally other suspended solids such as bio mass being precipitated and settled in the sedimentation stage, and being optionally recycled through the reaction stage to act as a microorganism support. If desired, however, the sulphur can, instead, be subjected to flotation instead of settling, to separate it from the water in the separation stage. The age of any biomass separated may be 2–30 days.

In the reaction stage, process parameters should be provided which permit, and indeed encourage and promote, the biological oxidation and the biological reduction reactions of the present invention. Such process parameters include:

- a dissolved oxygen content in the water being treated of at most 1 mg/l, preferably at most 0.1 mg/l, and more preferably at most 0.05 mg/l, eg 0.02 mg/l;
- a redox potential of at most 0 me, preferably at most −10 me, more preferably −460 me to −10 me, eg −100 me;
- a pH of 5–10, preferably 6–9 and more preferably 6–8, eg 7.5;
- a temperature of 5–40° C., preferably 10–37° C. and more preferably 20–37° C., eg 33° C;
- a mean residence time of 1 hour–240 hours, preferably 2–48 hours and more preferably 2–36 hours, eg 5 hours.

Routine experimentation can be used to optimize the above process parameters, and to optimize raw water flow rates and any recirculation rates, eg if sludge recirculation is employed, so as to obtain desirable results, or at least adequate, results. It is expected that raw water or feed water may have a sulphate and/or sulphite anion concentration of 50–20 000 mg/l, typically 500–5000 mg/l and usually 500–2500 mg/l, product water from which sulphur has been separated having a sulphide ion concentration of at most 3000 mg/l, preferably 0–2000 mg/l, eg 100 mg/l.

When the process is carried out on a continuous basis, the water being treated may be passed through a series of said common reaction stages in each of which both the anaerobic biological reduction and the biological oxidation take place through a said sludge separation stage at the end of the series, the method including recirculating water containing dissolved bicarbonate ($HCO^-_3$) anions from the sulphur separation stage to the reaction stages, thereby to cause a progressive rise in the pH of the water from reaction stage to reaction stage along the series in a downstream direction. When the raw water contains dissolved cations of at least one heavy metal, the process may include the step of raising the pH of the water being treated progressively along the series of reaction stages in a downstream direction to achieve a pH in at least one said reaction stage at which a solid reaction product of at least one said heavy metal is formed, the solid reaction product containing the heavy metal being separated from the water being treated. At least one heavy metal may be recovered as a by-product, each solid reaction product containing a heavy metal by-product being separated from the water being treated in a separation stage following immediately after the reaction stage in which said solid reaction product is formed, and before any succeeding reaction stage.

The solid reaction products containing heavy meals are typically heavy metal sulphides, and a series of said common reaction stages can be provided and operated at selected different pH's, respectively suitable for formation of solid reaction products of different heavy metals. Each of these reaction stages in which a solid heavy metal reaction product is formed may be associated with its own sedimentation stage, downstream thereof, for precipitation of the solid reaction product and separation thereof from the water, eg to recover the heavy metal in question. In this case water, containing dissolved sulphide ($S^=$) and bicarbonate ($HCO^-_3$) anions, may be recycled from the sedimentation stage at the end of the series to each of the reaction stages, the $HCO^-_3$ anions acting to raise the pH progressively along the series of the reaction stages, and the $S^=$ anions being available to react with the heavy metal cations in question. For example, arsenic can be precipitated as $As_2S_3$ and zinc can be precipitated as ZnS.

The process of the invention may be used to treat acid raw waters containing dissolved heavy metal cations and having pH's as low as 2 or less, in which case an alkali or base, conveniently calcium hydroxide or calcium carbonate ($Ca(OH)_2$ or $Ca(CO_3)_2$) may be added to the raw water to boost the increase in pH effected by recirculation of water containing $S^=$ and $HCO^-_3$ anions, to promote said progressive rise in pH along the series. It is thus an advantage of the invention that it can be used to treat waters having low pH's, optionally containing dissolved heavy metal cations.

While $Ca(OH)_2$ may be added to the raw water to promote a pH increase for heavy metal sulphide precipitation as described above, it may also be added to the various reaction stages, when it is desired to remove dissolved $HCO^-_3$ anions therefrom. This it does in accordance with the reaction (which results in solid $CaCO_3$ which can be precipitated in one or more of sedimentation stages)

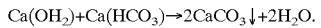

Instead, the $HCO^-_3$ content can be reduced by stripping carbon dioxide ($CO_2$) from the water, eg by bubbling nitrogen ($N_2$) through the water. It should be noted that $Ca(OH)_2$ addition can only be carried out to a limited degree because, if the pH of the water becomes too high, this can adversely affect the biological reduction and/or biological oxidation reactions of the present invention. Nevertheless, the $Ca(HCO_3)_2$ content of the water can be reduced in this fashion by a value typically of 10–30%, provided the pH, does not exceed 8. Although the reaction of $Ca(OH)_2$ with $Ca(HCO_3)_2$ produces water which results in some biomass dilution, the solid $CaCO_3$ can provide a support medium for growing microorganisms. Finally, it should be noted that, if it is desired to rid the product water, after the final sedimentation stage, of dissolved $Ca(HCO_3)_2$, this can be done by using $Ca(OH)_2$ to raise the pH to above 9 to precipitate $CaCO_3$ according to said reaction:

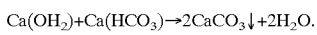

$$Ca(OH_2)+Ca(HCO_3) \rightarrow 2CaCO_3 \downarrow + 2H_2O.$$

The process may thus include the step of removing dissolved bicarbonate ($HCO^-_3$) anions from the water being treated.

When there is a series of reaction stages, some anaerobic biological reduction and some biological oxidation will take place, in accordance with the invention, in each reaction stage. In the earlier stages of the series the anaerobic biological reduction will typically predominate, compared with the biological oxidation, whereas in the later stages the biological oxidation will typically predominate, compared with the anaerobic biological reduction.

The invention extends to water whenever treated according to the process described above, The invention will now be described, by way of example, with reference to the accompanying diagrammatic drawing in which:

FIG. 1 shows a schematic flow diagram of an installation for a process according to the present invention; and FIG. 2 shows part of a variation of the flow diagram of FIG. 1.

In FIG. 1 of the drawings, reference numeral 10 generally designates an installation for carrying out a process in accordance with the present invention. The installation comprises a raw water feed line 12 shown feeding into an anaerobic reactor 14 at a high level, The reactor 14 has a high level water outlet feeding into flaw line 16, a low level air inlet fed by air supply line 18, and a high level gas outlet line 20.

Flow line 16 feeds via a feed well 21 into an open-topped sedimentation tank 22 having a high level product water outlet line 24 and a low level sludge outlet line 26. Line 26 splits into a sulphur and waste biomass product line 28 and a recycle line 30 which feeds into line 12.

In accordance with the process of the present invention raw water to be treated with a sulphate ion content of about 1200 mg/l is fed continuously into reactor 14 along line 12, and air is fed to the reactor along line 18. Process parameters in the reactor 14 are controlled to obtain a dissolved oxygen content of about 0.02 mg/l, a redox potential of about −100 me, a pH of about 7.5, a temperature of about 20° C. and the water having a mean residence time in the reactor 14 of about 8 hours. Although feeding air to the reactor is employed for creating the oxidizing conditions required for the biological oxidation described hereunder, light may be used instead of, or in addition to, the air, for this purpose.

In the reaction stage 14 sulphate anions and any sulphite ions present are anaerobically biologically reduced to sulphide anions, while at least part of the sulphide anions so produced are biologically oxidized to elemental sulphur. Waste gases issue from reactor 14 via line 20 and water and suspended elemental sulphur are withdrawn from reactor 14 via line 16 and fed into tank 22.

In tank 22 elemental sulphur-rich sludge is settled, clarified product water issuing along flow line 24 and sludge issuing along flow line 26. Product sulphur is withdrawn along line 28 and a proportion of the sludge from line 26 is circulated along line 30 into line 12, so as to maintain the required sludge content of about 2–50 g/l (as volatile suspended solids) in the reactor 14, where the sludge acts as a support for microorganisms in the reactor 14. The microorganisms used are *Desulfovibrio desulfuricans* for the reduction and *Thiobaccilus thiooxidans* for the oxidation.

Suitable nutrients, including trace elements and a suitable carbon/energy source for the microorganisms in the form of sugar will be dosed to the reactor 14, eg continuously, along a nutrient feed line (not shown) at an appropriate rate The product water issuing along flow line 24 will have a sulphate content of about 200 mg/l.

In FIG. 2 the same reference numerals are used for the same parts as in FIG. 1, and it is to be noted that in FIG. 2 there is a series of reactors 14, each associated with its own sedimentation tank 22. Each tank 22 is connected to the succeeding reactor 14 by a flow line 17. The recycle line 30 of FIG. 1 is omitted, and is replaced by a recycle line 32 which branches from the water outlet line 24, and which in turn branches into branch lines 34. The lines 26 and 28 are omitted and each tank 22 has its own solids outlet line 36, forming a by-product outlet line.

Operation of the process of the present invention with reference to FIG. 2 is similar to that described above with reference to FIG. 1. The primary difference, however, is that FIG. 2 is intended for treating water having a pH as low as 2 and containing heavy metal cations dissolved therein, to remove heavy metals from the water as well as to reduce its content of anions which contain sulphur and oxygen such as sulphates and sulphites. The water recirculated along line 32 feeds via branch lines 34 into each of the reactors 14 progressively raising the pH of the water, from reactor to reactor, as it passes along the series of reactors 14, the pH reaching about 7.5 after the last tank 22 of the series. In the reactors 14 heavy metal cations react with sulphide anions in this recycled water to form heavy metal sulphide solids, which are precipitated in the associated tanks 22 and recovered via the by-product outlet lines 36, sulphur being removed via lines 36 together with heavy metal sulphides. If the raw water contains, for example, dissolved As or Zn cations, these will be precipitated at a pH above 2 but below 7.5, and can be recovered as by-products.

It should be noted that, in a modification of the flow diagram of FIG. 1, provision can be made for the recirculation of water from tank 22 to the reactor 14, via a separate oxidation stage (not shown) in which microorganisms are cultivated, eg on supports, and are used for the biological photosynthetic oxidation and/or chemical oxidation (using air in suitable amounts) of sulphide anions to sulphur. This can act to supplement the oxidation of sulphide anions to sulphur which takes place in the reactor 14. Indeed, water can be removed from the reactor 14, subjected to conversion of sulphide to sulphur in this fashion, and then returned to reactor 14. Conveniently, sulphur, as a valuable by-product, can be recovered from this separate oxidation stage.

It is an advantage of the invention that it provides a simple and inexpensive process for the treatment of water containing dissolved sulphate anions, to reduce the sulphate content thereof.

What is claimed is:

1. A process for treating a raw water having anions comprising sulphur and oxygen dissolved therein, the process comprising the steps of:

subjecting the anions comprising sulphur and oxygen to an anaerobic biological reduction whereby the anions comprising sulphur and oxygen are converted to sulphide ($S^=$) anions to produce dissolved sulphide anions in the water;

subjecting the sulphide anions, produced in the water by the anaerobic biological reduction, to a biological oxidation whereby the dissolved sulphide ions are oxidized to elemental sulphur to produce suspended elemental sulphur in the water; and separating from the water the suspended elemental sulphur produced in the water, the anaerobic biological reduction and the biological oxidation being effected simultaneously in the presence of each other in a series of common reaction stages in which there are oxidizing conditions which permit the biological oxidation to take place without preventing the anaerobic biological reduction from taking place, the process being carried out on a continuous basis, there being a continuous feed of raw water to the series of common reaction stages and the anaerobic biological reduction and the biological oxidation taking place continuously in the common reaction stages, water containing elemental sulphur and biomass being continuously withdrawn from the reaction stages and continuously fed to a sludge separation stage, separate from the reaction stages, where the continuous separation of the elemental sulphur, together with biomass, from the water takes place, the process including continuous recirculation of part of the separated sulphur and biomass, sufficient to maintain a suspended solids content in the reaction stages of 2–50 g/L, the water being treated being passed through said series of common reaction stages in each of which both the anaerobic biological reduction and the biological oxidation take place, and through said sludge separation stage at the end of the series, the process including recirculating water containing dissolved bicarbonate ($HCO_3^-$) anions from the sulphur separation stage to the reaction stages, thereby to cause a progressive rise in the pH of the water from reaction stage to reaction stage along the series in a downstream direction.

2. A process as claimed in claim 1, in which the dissolved anions consisting of sulphur and oxygen are selected from the group consisting of:

$SO_4^=$;
$SO_3^=$;
$S_2O_5^=$;
$S_2O_3^=$;
$S_4O_6^=$;
$S_2O_4^=$;
$S_4O_8^=$; and mixtures thereof.

3. A process as claimed in claim 1, in which the oxidizing conditions in the reaction stage are achieved by dissolving a chemical oxidizing agent in the water, the chemical oxidizing agent being selected from:

nitrate anions
nitrite anions;
elemental oxygen; and
mixtures thereof.

4. A process as claimed in claim 1, in which the water in the reaction stage is subjected to irradiation which permits photosynthetic anaerobic biological oxidation to contribute to the oxidizing conditions which permit the biological oxidation of the dissolved sulphide ions to elemental sulphur.

5. A process as claimed in claim 1, in which the raw water, prior to the treatment thereof, contains dissolved anions consisting of sulphur and oxygen which are selected from $SO_4^-$ (sulphate) and $SO_3^-$ (sulphite) anions, the reaction stage being subjected to irradiation and the water containing elemental oxygen as a chemical oxidizing agent dissolved therein so that both an aerobic biological oxidation of dissolved sulphide anions, and a photosynthetic anaerobic biological oxidation of dissolved sulphide anions, to form element sulphur in the water, take place.

6. A process as claimed in claim 1, in which the raw water contains dissolved cations of at least one heavy metal, the process including the step of raising the pH of the water being treated progressively along the series of reaction stages in a downstream direction to achieve a pH in at least one said reaction stage at which a solid reaction product of at least one said heavy metal is formed, the solid reaction product containing the heavy metal being separated from the water being treated.

7. A process as claimed in claim 1, in which the raw water contains dissolved cations of at least one heavy metal, the process including the step of raising the pH of the water being treated progressively along the series of reaction stages in a downstream direction to achieve a pHl in at least one said reaction stage at which a solid reaction product of at least one said heavy metal is formed, the solid reaction product containing the heavy metal being separated from the water being treated.

8. A process as claimed in claim 1, which includes the step of removing dissolved bicarbonate ($HCO^-_3$) anions from the water being treated.

9. A process for treating a raw water having anions comprising sulphur and oxygen dissolved therein, the process comprising:

subjecting said anions to an anaerobic biological reduction whereby they are converted to sulphide ($S^=$) anions to produce dissolved sulphide anions in the water;

subjecting the sulphide anions, produced in the water by the anaerobic biological reduction, to a biological oxidation under oxidizing conditions achieved by dissolving a chemical oxidizing agent in the water, whereby the dissolved sulphide ions are oxidized to elemental sulphur to produce suspended elemental sulphur in the water; and separating from the water the suspended elemental sulphur produced in the water, the anaerobic biological reduction and the biological oxidation being effected simultaneously in the presence of each other in at least one common reaction stage in which said oxidizing conditions permit the biological oxidation to take place without preventing the anaerobic biological reduction from taking place.

10. A process as claimed in claim 9, in which each reaction stage is provided by a reactor selected from the group consisting of:

packed-bed reactors;
fluidized-bed reactors;
completely-mixed reactors; and
gas-lift reactors.

* * * * *